(12) United States Patent
Andersson et al.

(10) Patent No.: US 8,806,713 B2
(45) Date of Patent: Aug. 19, 2014

(54) PIPE OR CABLE LEAD-THROUGH HAVING MODULARIZED MODULES

(75) Inventors: Jens Andersson, Hasslö (SE); Jenny Filipsen, Karlskrona (SE); Ulf Hildingsson, Nättraby (SE); Christer Lundborg, Karlskrona (SE); Stefan Milton, Ramdala (SE); Ronnie Pettersson, Jämjö (SE); Jörgen Åkesson, Lyckeby (SE); Mats Ericson, Asarum (SE)

(73) Assignee: Roxtec AB, Karlskrona (SE)

( * ) Notice: Subject to any disclaimer, the term of this patent is extended or adjusted under 35 U.S.C. 154(b) by 400 days.

(21) Appl. No.: 13/138,153

(22) PCT Filed: Feb. 2, 2010

(86) PCT No.: PCT/EP2010/051230
§ 371 (c)(1),
(2), (4) Date: Sep. 30, 2011

(87) PCT Pub. No.: WO2010/089286
PCT Pub. Date: Aug. 12, 2010

(65) Prior Publication Data
US 2012/0266409 A1      Oct. 25, 2012

(30) Foreign Application Priority Data
Feb. 4, 2009   (SE) ..................................... 0950037

(51) Int. Cl.
*F16L 5/02*      (2006.01)
*B21D 39/03*    (2006.01)

(52) U.S. Cl.
CPC .. *F16L 5/02* (2013.01); *B21D 39/03* (2013.01)

USPC .............................................. 16/2.2; 174/111

(58) Field of Classification Search
CPC ............. F16L 5/20; B21D 39/03; H02G 3/22; H02G 15/013; H02G 3/088; H02G 3/0658
USPC .............................................. 16/2.2; 174/111
See application file for complete search history.

(56) References Cited

U.S. PATENT DOCUMENTS 4,901,956 A * 2/1990 Jacobsen ......................... 248/56
5,108,060 A * 4/1992 Beele ............................. 248/56

(Continued)

FOREIGN PATENT DOCUMENTS

| CL | 828-92   | 2/1993 |
| CL | 1070-93  | 3/1994 |

(Continued)

OTHER PUBLICATIONS

International Search Report.

(Continued)

*Primary Examiner* — Timothy Thompson
*Assistant Examiner* — Charles Pizzuto
(74) *Attorney, Agent, or Firm* — Harness, Dickey & Pierce, P.L.C.

(57) ABSTRACT

A compressible module having an axial groove for localization of a cable or pipe having at least two module sections or submodules having differing physical properties.

13 Claims, 2 Drawing Sheets

(56) References Cited

U.S. PATENT DOCUMENTS

| | | | |
|---|---|---|---|
| 5,194,192 A | | 3/1993 | Seebode |
| 5,808,530 A | * | 9/1998 | Kalonji et al. ............... 333/260 |
| 2009/0194644 A1 | | 8/2009 | Lundborg |
| 2010/0219589 A1 | * | 9/2010 | Akesson ..................... 277/606 |

FOREIGN PATENT DOCUMENTS

| | | | |
|---|---|---|---|
| CL | 3165-04 | | 12/2004 |
| CL | 2167-08 | | 2/2009 |
| CL | 1796-11 | | 8/2010 |
| DE | 8707566 U1 | | 7/1987 |
| EP | 0429916 A2 | | 6/1991 |
| EP | 0 898 106 | | 2/1999 |
| SE | 200701182 A | * | 5/2007 |
| WO | WO 2005/057749 | | 6/2005 |
| WO | WO-2006130104 A1 | | 12/2006 |
| WO | WO-2008069716 A1 | | 6/2008 |
| WO | WO-2008140399 A1 | | 11/2008 |

OTHER PUBLICATIONS

Office Action for a corresponding Chilean patent application issued on Nov. 11, 2013.

* cited by examiner

PIPE OR CABLE LEAD-THROUGH HAVING MODULARIZED MODULES

TECHNICAL FIELD

The present invention concerns a seal, lead-through or transit for cables or pipes. The invention especially concerns parts of the seal or transition, having peelable sheets for adaptation to diameters of a cable or pipe to be received.

PRIOR ART

In the prior art there are cable transitions or the like having a frame, inside which a number of modules to receive cables, wires or pipes are placed. The modules are made of an elastic material e.g. rubber or plastics and are thus compressible. Inside the frame normally a number of modules are received side by side in one or more rows together with some kind of compression unit. The compression unit is placed between the frame and the modules in such a way that when the compression unit is expanded the compressible modules will be compressed around the cables, wires or pipes. For ease of description the expression "cable" is mainly used in this description, but it should be construed broadly and a person skilled in the art realises that it normally also covers pipes or wires.

Another type of seal, cable transition, pipe penetration etc. has a general cylindrical form and is to be received in a sleeve in a wall or an opening in a wall. To function in the desired way the seal should fit snugly into the sleeve or the opening of the wall in which it is received and the seal should be adaptable to the actual mounting dimension. The mounting dimension is dictated by the inner diameter of the sleeve or the opening. The seal has a cylindrical compressible body, which is compressed axially between fittings at the opposite ends of the compressible body. By the axial compression the cylindrical body will expand radially both inwards and outwards.

Furthermore, the pipes, wires or cables received may have different outer diameters, and, thus, the module should be adaptable to cables or pipes having different outer diameters.

Seals or transitions of both the above kinds are used for sealing in many different environments, such as for cabinets, technical shelters, junction boxes and machines. They are used in different industrial environments, such as automotive, telecom, power generation and distribution, as well as marine and offshore. The seals or transitions may have to seal against fluid, gas, fire, rodents, termites, dust, moisture etc., and may receive cables or wires for electricity, communication, computers etc., pipes for different gases or liquids such as water, compressed air, hydraulic fluid and cooking gas or wires for load retention.

The parts receiving a single cable etc. of both the types discussed above often have a pack of peelable layers or sheets on the inside. The layers or sheets are peeled off until the inner diameter of the part is adapted to the outer diameter of the cable received in said part. The sheets adhere strong enough to each other to stay together and at the same time loose enough to enable the sheets to be peeled off from the stack, either one-by-one or a number of sheets together. In some embodiments there are also peelable layers or sheets on the outside, making it possible to adapt the outer dimensions of for instance a circular seal to a specific opening or sleeve.

A person skilled in the art realises that the exact shape and form of the different parts, including the layers, may vary without departing from the gist of the present invention. For example the pack of layers may have another cross sectional form than circular.

It is apparent from the above that the theoretical number of combinations of different demands is vast. Further, most sealing systems need approval from a certifying authority, which is an important safety issue that also makes it time consuming to provide tailor-made sealing systems for specific applications.

The present invention provides a solution to the above and other problems in prior art by the provision of a modularized module for sealing or lead-through of a cable transit or pipe penetration.

SUMMARY

The present invention provides a compressible sealing module to be arranged in a frame, which module has a through hole in a length direction for receiving a cable or pipe. The compressible sealing module is characterized in that it comprises at least two sub-modules with different properties, joined end to end, wherein at least one of the sub-modules has a through hole provided with removable sheets of material which may be removed for adaptation to various cable or pipe diameters.

One significant advantage with the present invention is that it shortens the "time to market". It also rationalizes the production methods by providing a less expensive way of producing tailor-made sealing modules. The key to this is that each submodule may be approved by relevant certifying authorities, e.g. in regard of fire prevention, sealing abilities etc. When a customer want to have a sealing module with specific properties, e.g. with a certain explosion resistance and a certain ability to block electromagnetic disturbances, it will be possible to fingerpick submodules having the individual properties, and combine these, e.g. one submodule to prevent unwanted electromagnetic fields by e.g. grounding the cable screen. The time to provide a certified solution to a customer will be the time it takes to join the submodules, and deliver the module. This may be compared to the alternative; designing a new module, which has to be tested and evaluated for approval by the certifying authority, before being commercially interesting.

These advantages propagate throughout the production process, and results in a faster and less expensive product development, shorter production times, shorter lead times, lower production costs. The example mentioned above has the additional benefit that it reduces installation times significantly.

In one or more embodiments the compressible module comprises three submodules, two identical modules sandwiching a third module with specific properties. This third submodule may provide fire resistance, explosion resistance, shielding against electromagnetic disturbances, and so forth. The two sandwiching submodules may be of a standard design.

In one or more embodiments one submodule is designed from a conductive material, so as to provide shielding properties. The material may be an electrically conductive synthetic or natural rubber. This submodule may also have peelable sheets of material for adaptation to various cable or pipe diameters. In such an embodiment it is foreseen that an electrical cable provided with a screen is arranged in the compressible module in such a way that a stripped portion of the cable is in contact with the conductive module. In this way the electrical potential may be equalized in the system and connected to ground. The conductive submodule will also function as a Faraday shield and efficiently attenuate electromagnetical disturbances.

The inventive compressible module may be arranged in a frame, or directly in an opening in a delimiting structure, in which case the edges of the opening in the structure will constitute the frame. Several compressible modules may be arranged in one opening, as is described in several applications by the present applicant.

Normally, one or more compressible modules are arranged in the opening. Thereafter the modules are compressed to achieve a tight fit between individual modules, and between a single module and the cable or pipe arranged therein. The applicant utilizes two main strategies for achieving compression, yet the present invention is not limited to those strategies. The first strategy involves arranging a compression unit together with the modules within the constraints of the frame. The compression unit is thereafter mechanically expanded, and compresses the compressible modules. This type of compression unit is described in several applications by the present applicant. The second strategy involves arranging a resilient body between two compression plates, and arranging the compressible modules in an opening in the resilient body. Compression of the resilient body by means of the compression plates will make it expand, and as it expands it will compress the compressible modules. This strategy is also described in several applications by the present applicant. There are other examples of compression units, and the present invention should obviously not be limited to any particular type of compression unit.

DETAILED DESCRIPTION OF EMBODIMENTS

Figure 1:
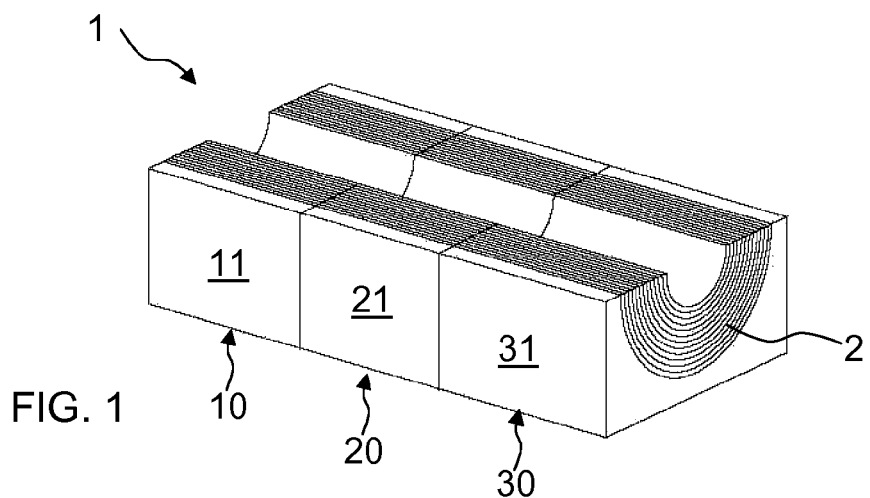
FIG. 1 is a perspective view of a first embodiment of the present invention.

FIG. 1 illustrates the lower half of a compressible module 1 according to a first embodiment of the present invention. In this example embodiment each submodule 10, 20, 30 comprises two base parts (of which only the lower is shown) 11, 21, 31 having peelable layers of material 2 arranged in a groove thereof, for adaptation to a diameter of a cable or pipe to be arranged in the compressible module 1. In the practical example an identical module half is arranged in an opposing relationship to the first. In other examples the submodule 20 in the middle may not have peelable layers, and the same may be true for the submodules 10, 30 sandwiching the centre submodule 20. The number of submodules forming the module may also vary, yet for obtaining the inventive advantages the number of submodules is at least two. The longitudinal size of the submodules may also vary. Today the frame in which the modules are to be arranged has a specific longitudinal extension (generally orthogonal to the structure in which it is arranged). However, even within these constraints it is foreseeable that the longitudinal size of the submodules may vary, preferably in such a way that it is possible to combine into the more or less standardized longitudinal extension of the frame.

Figure 2:
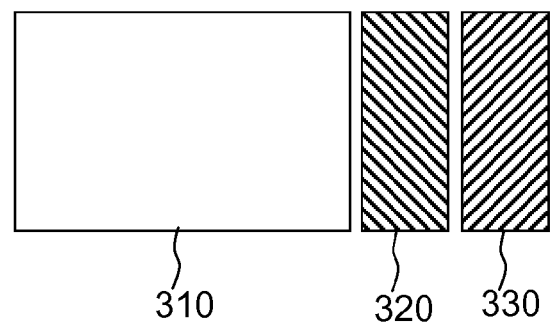
FIG. 2 is a top plan view of a second embodiment of the present invention.

An example of the above is illustrated referring to FIG. 2. Here ⅔ of the module length is taken by a submodule 310 providing a gas tight seal and traction relief, ⅙ by a submodule 320 providing shielding against electromagnetic disturbances, and the last ⅙ by a submodule 330 providing fire resistance.

Figure 3:
FIG. 3 is a top plan view of a third embodiment of the present invention.
Figure 4:
FIG. 4 is a top plan view of a fourth embodiment of the present invention.

The individual submodules may be fixedly or releasably attached to an adjacent submodule. A fixed attachment may be more adequate for safety reasons, yet situations may occur where a releasable attachment may be more appropriate. One example a releasable attachment is the tongue and groove arrangement shown in FIGS. 3 and 4. A fixed attachment may be provided by an adhesive, a weld, plugs etc.

An alternative system including a frame is described in the simultaneously filed application entitled "Sealing System", filed by the applicant of the present application. This application is hereby incorporated by reference.

In further alternative embodiments the seal, lead-through or transit of the present invention is furnished with means for lubrication as shown in the simultaneously filed application entitled "Lubrication of a Pipe or Cable Lead-Through", filed by the applicant of the present application. This application is hereby incorporated by reference.

Alternative embodiments of the modules are given in the simultaneously filed applications entitled "Eccentric Part of a Pipe or Cable Lead-Through", "A Module of a Pipe or Cable Lead-Through having Grooves on Opposite Sides", "Pipe or Cable Lead-Through Blocks", "Modules of a Pipe or Cable Lead-Through having Alternating Geometry", "A Pipe or Cable Lead-Through having Modules with a Dimensioning Function" and "A Pipe or Cable Lead-Through having Layers of Alternating Geometry", filed by the applicant of the present application. In one embodiment the modules are separated from a stack of module halves sticking together, as described in the simultaneously filed application named "Modules of Pipe or Cable Lead-Through Sticking Together", filed by the applicant of the present application. These applications are hereby incorporated by reference.

The sheets may be arranged in many different ways and with different features as reflected in the simultaneously filed applications entitled " A Pipe or Cable Lead-Through having Interconnected Layers", "A Pipe or Cable Lead-Through having Layers of Different Thickness", "A Pipe or Cable Lead-Through having a Part Indicating Compression", "Cohering Between Layers of a Pipe or Cable Lead-Through" and "Identification of Layers of a Pipe or Cable Lead-Through", filed by the applicant of the present application. These applications are hereby incorporated by reference.

Figure 5:
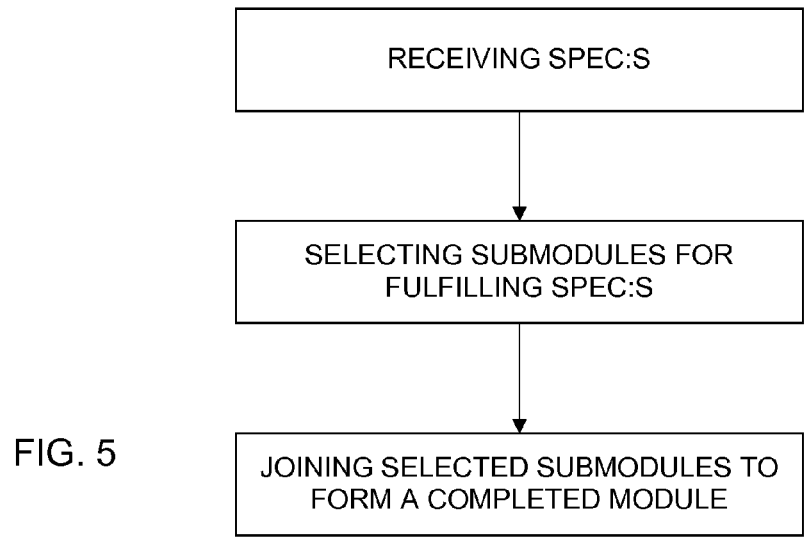
FIG. 5 is a flow chart of an inventive production method according to one embodiment.

FIG. 5 illustrates a first embodiment of an inventive method. In a manufacturing plant specifications regarding a specific transition or seal is received. Submodules are assembled to fulfill the specifications, and the submodules are joined and forwarded in the process. Approval documents for each submodule or for the assembled module as a whole may join the subsequently delivered module.

A listing of suggested submodules that may be used for achieving particular purposes may be found below. The list is not exhaustive, yet it illustrates the flexibility provided by the inventive system Include RFID in the module in order to provide traceability to installations. An RFID tag may be included in the central submodule.

In installations where plastic tubing is used the central submodule may comprise heat expandable material. In case of excessive heat the plastic module will melt, or be deformed, which could introduce a risk of leakage or fire spread. In the case of such an event, however, the heat expandable material will expand and fill any void created by the deformation of the plastic tubing.

The central submodule may comprise a material, suggestively a rubber material, which expands when in contact with water. This solution will give an improved sealing.

The central submodule may be formed of a material conducting electrical current. This will serve several purposes, such as grounding a screen of a cable lead through the module and shielding against electromagnetic radiation. Compared to prior art solutions used for this purpose the present embodiment may provide a significant reduction in installation time, in particular if the central submodule is provided with peelable layers of material.

The central submodule may be provided with a material having a greater fire resistance. Since the submodules sandwiching the central submodule may provide the sealing properties, the central submodule may be optimized on other parameters, such as fire resistance.

One submodule may comprise a material adapted to absorb oscillations of a specific frequency and/or magnitude. Such a submodule may e.g. be advantageous in many marine installations or in wind turbines, etc. One such embodiment includes that the contact surface of the submodule, which contact surface is in contact with the cable or other service, has a granular texture. The contact surface may even be provided with several individual projections. In one or more embodiments the granular surface or the projections may be formed from a material being softer/more resilient than the base material of the submodule, which may further improve the ability to absorb or attenuate vibrations. In a related embodiment a portion of the submodule, such as the portion arranged in the place of the peelable layers of material, or indeed the entire submodule may be manufactured from this softer/more resilient material. Apart from being well adapted for absorbing/attenuating vibrations, such an embodiment would also adapt well to e.g. cables having a non-circular cross section. It is to be understood that this inventive idea may be generalized from an embodiment of a specific submodule to a feature which may be given to any compressible sealing module of prior art, and may in other words be used as a standalone feature ranging beyond the intended scope of the present application. In such a case there may be instances where the ability to dampen vibrations is prioritized before the sealing properties. One major advantage relating to the dampening of vibrations is that the lifespan of the compressible module, as well as the service inserted therein, may be prolonged.

Measurement sensors may be provided in the central submodule. The sensors may be continuously monitored on-line to supervise the performance of the module. The measurements sensors may include temperature sensors, pressure sensors, gas sensors, etc.

In one or more embodiments a sealing module may have sealing material arranged within a shell. Said shell may be adapted to rupture in a controlled manner when compressed. In this way the sealing material may be ejected and completely fill any voids between the cable (or other service) and the sealing module and thus effect an improved seal. This is particularly useful for services having an irregular or complex shape. Typical materials may include a silicone-based substance, a glue substance or other viscous substance adequate for the purpose.

The modules may give improved explosion resistance. This may be achieved by improving the coupling strength between the separate modules and between the modules and a frame and/or stay plates. The improved coupling strength may be achieved by mechanical means and/or adhesives, or by other means.

Further purposes may include sound attenuation, chemical resistance and protection against rodents and termites. In an embodiment relating to increase resistance to chemicals one or several submodules may be formed from silicone, Fluor rubber or Nitrile rubber, or similar materials. An embodiment with increased protection against termites may include a submodule with an embedded fine-meshed screen made of a material withstanding termite attacks such as a metal mesh, or a pesticide.

In the above examples it is the central submodule which is provided with altered properties. The reason for this is that the foreseen commercial product at the moment is a product where a central submodule having altered properties are sandwiched between two, submodules, preferably certified submodules. The invention should not, however, be limited in this respect. The number of submodules may be two or more, and the module with altered properties may be positioned in another manner, if suitable for a particular application.

Figure 6:
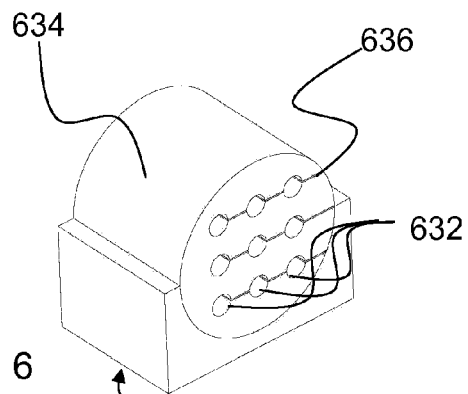
FIG. 6 is a perspective view of a fifth embodiment of the present invention.

FIG. 6 is a side view of a fifth embodiment of the present invention. This embodiment is particularly well suited for cables including a number of wires, such as a fiber optical cable including a number of optical fibers. A first submodule (not shown) has one single opening, which may be dimensioned to the outer diameter of the cable (or other service), while a second module 630 has several openings 632, dimensioned in number and size in relation to the number and diameter of the optical fibers (or other internal wires or services). In this way a module comprising a module of the first "conventional" type and the second type 630 will provide sealing as well as load retention. It should be noted that FIG. 6 represents an illustrative view only, and in particular it does not depict an actual product, which may differ in scale, and configuration. It may be noted that the submodule 630 may be manufactured by replacing a stack of peelable layers otherwise arranged in the groove with an essentially cylindrical body 634. This cylindrical body 634 has openings 632 and slits 636 extending from the outer surface of the cylindrical body 634 all the way in to the openings 632, such that individual wires may be slid into position in a suitable opening 632. In one preferred embodiment a first set of slits 636 connect a first set of openings 632 with the outer surface of the cylindrical body 634, and a second set of slits connects the first set of openings with a second set of openings, etc, such as is shown in FIG. 6. The applicant foresees modules comprising one or more openings for cables in one end, and multiple openings in the other end for the wires/fibers inside each cable. In general terms this embodiment may be represented by a sealing module having a first number of, one or more, openings for services in one end and a second number of, two or more, openings for services in the other end, wherein the second number exceeds the first. This may be accomplished by using submodules having different number of openings, yet it may also be accomplished with a single, specially designed, sealing module.

Figure 7:
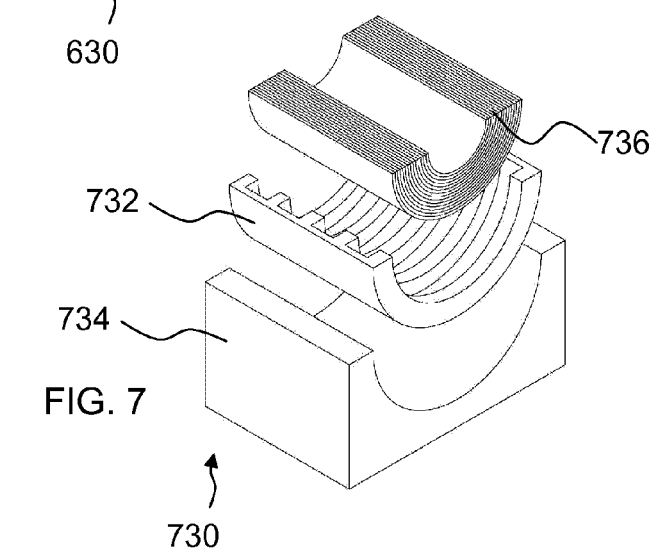
FIG. 7 is an exploded perspective view of a sixth embodiment of the present invention.

The exploded perspective view of FIG. 7 illustrates a sixth embodiment of the present invention, which is adapted for absorbtion/attenuation of vibrations. In this embodiment the relevant submodule 730 contains a ribbed inlay 732 arranged between the base part 734 of the module and the optional stack of peelable layers of material 736. The ribbed inlay 732 may preferably be designed from a material being softer than the base part 734 of the module, and softer than the peelable sheets in the stack 736 too. In particular its softness/resilience as well as the extension and number of the ribs may be dimensioned for vibrations of a particular frequenzy and/or amplitude. In this way it will absorb/attenuate vibrations more efficiently. The arrangement of the ribbed inlay inside of a stack of peelable layers of material may provide a more versatile solution as compared to the previously described (in this text) solutions for vibration dampening. It may be noted that the ribbed inlay of the present embodiment, having ribs extending radially inwards and being orthogonal to an axial direction of the module, has a beneficial feature in that it will ensure sealability. The skilled person realized that the projections (i.e. the ribs) may have another appearance, such that individual projecting dots of material, or may even be replaced by a solid inlay with corresponding resilience. This embodiment too may be used as a standalone feature for an individual module as well as for a submodule.

According to one or more embodiments, in particular according to—or in combination with—any of the previously mentioned embodiments, an outermost submodule may be a sealing submodule, i.e. a submodule which is adapted to provide a seal against any of fluid, gas, dust, moisture etc.

The invention claimed is:

1. A compressible module for cable entries or pipe penetrations, which cable entries or pipe penetrations are placed either directly in an opening through a wall or other structural partition forming the wall or other partition or in a frame, whereby a barrier is formed of the one or more modules and at least one compression unit in either the opening or the frame, the compressible module comprising:
   an upper half;
   a lower half;
   wherein each of the upper half and the lower half include at least two module sections in the form of submodules having differing physical properties; and
   an axial groove in each of the at least two module sections for localization of the cable or pipe, the axial groove being of substantially the same dimensions and contiguous among the at least two module sections, wherein an outermost submodule is a sealing submodule.

2. The compressible module of claim 1, wherein at least one of the submodules is provided with at least one peelable layer for adapting to the diameter of the cable or pipe, which at least one peelable layer is placed in a groove of the module.

3. The compressible module of claim 1, wherein said at least two submodules are interconnected.

4. The compressible module of claim 3, wherein the submodules are interconnected by at least one of an adhesive, a weld, and a snap-in fit so as to be interconnected.

5. The compressible module of claim 1, wherein the physical properties include electrical conductivity, fire resistance, explosion resistance, sound attenuation, compressibility, ability to take up vibrations and ability to withstand different chemicals, rodents or termites.

6. The compressible module of claim 1, comprising at least three submodules.

7. The compressible module of claim 6, wherein the outermost submodules are identical.

8. The compressible module of claim 1, wherein the module comprises two base parts which when assembled form the compressible module.

9. The compressible module of claim 1, wherein said module has at least one opening for services in one end, and at least two openings for services in the other end, wherein the number of openings in the second end exceeds the number of openings in the first end.

10. The compressible module of claim 8, wherein one submodule comprises a material positioned to contact a service arranged therein being softer/more resilient than a base part of the compressible module.

11. The compressible module of claim 2, wherein an inlay is arranged in the said groove, between said at least one peelable layer and the module, said inlay having a greater resilience than the module.

12. A sealing system, comprising:
   a frame for cable entries or pipe penetrations receiving compressible modules surrounding each cable or pipe received in the frame, which frame is placed in a wall or other structural partition forming an opening through the wall or other partition, whereby a barrier of modules are placed together with at least one compression unit at one end of the frame, wherein said compressible module is a module according to claim 1.

13. The compressible module of claim 1, wherein facing surfaces of the at least two module sections are in direct contact with one another.

\* \* \* \* \*